(12) United States Patent
Haussmann

(10) Patent No.: US 12,512,546 B2
(45) Date of Patent: Dec. 30, 2025

(54) BATTERY HOUSING, BATTERY SYSTEM AND ASSEMBLY METHOD FOR A BATTERY SYSTEM

(71) Applicant: WEBASTO SE, Stockdorf (DE)

(72) Inventor: Jochen Haussmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 1059 days.

(21) Appl. No.: 17/265,786

(22) PCT Filed: Aug. 6, 2019

(86) PCT No.: PCT/EP2019/071138
§ 371 (c)(1),
(2) Date: Feb. 3, 2021

(87) PCT Pub. No.: WO2020/030651
PCT Pub. Date: Feb. 13, 2020

(65) Prior Publication Data
US 2021/0167465 A1 Jun. 3, 2021

(30) Foreign Application Priority Data
Aug. 6, 2018 (DE) ...................... 10 2018 119 051.4

(51) Int. Cl.
H01M 50/249 (2021.01)
H01M 50/204 (2021.01)
(Continued)

(52) U.S. Cl.
CPC ....... H01M 50/249 (2021.01); H01M 50/204 (2021.01); H01M 50/289 (2021.01);
(Continued)

(58) Field of Classification Search
CPC .................................................. H01M 50/249
See application file for complete search history.

(56) References Cited

U.S. PATENT DOCUMENTS 6,365,297 B1 * 4/2002 Wolczak
2004/0171303 A1 9/2004 Kubisch et al.
(Continued)

FOREIGN PATENT DOCUMENTS

CN 103346282 A * 10/2013
CN 106505169 A 3/2017
(Continued)

OTHER PUBLICATIONS

Chinese Office Action dated Jan. 11, 2023, for Chinese Application No. 201980052253.4; 10 pages.
(Continued)

Primary Examiner — Matthew T Martin
Assistant Examiner — Krishna R Hammond
(74) Attorney, Agent, or Firm — Haynes and Boone, LLP

(57) ABSTRACT

A battery housing for an electric vehicle includes two receiving chambers, which are separated from one another by means of a partition wall, for receiving battery cells, and a conductor sheath that penetrates the partition wall and can receive an electrical connecting element so as to connect in an electrically conductive manner the battery cells that are to be arranged in a different receiving chamber of the two receiving chambers.

17 Claims, 4 Drawing Sheets

(51) Int. Cl.
*H01M 50/289* (2021.01)
*H01M 50/505* (2021.01)
*H01M 50/514* (2021.01)

(52) U.S. Cl.
CPC ....... *H01M 50/505* (2021.01); *H01M 50/514* (2021.01); *H01M 2220/20* (2013.01)

(56) References Cited

U.S. PATENT DOCUMENTS

| | | | |
|---|---|---|---|
| 2011/0223466 A1* | 9/2011 | Lee | |
| 2015/0214531 A1 | 7/2015 | Sun et al. | |
| 2015/0214534 A1* | 7/2015 | Callicoat | |
| 2018/0069222 A1* | 3/2018 | Shaffer, II | H01M 10/044 |
| 2018/0337387 A1* | 11/2018 | Shoji | H01M 10/482 |

FOREIGN PATENT DOCUMENTS

| | | |
|---|---|---|
| DE | 102014101335 A1 | 8/2015 |
| DE | 102014014850 A1 | 4/2016 |
| GB | 790025 A | 1/1958 |
| JP | 2014207053 A | 10/2014 |
| JP | 2015149213 A | 8/2015 |
| WO | WO 2012036194 A1 | 3/2012 |

OTHER PUBLICATIONS

International Search Report and Written Opinion for International Patent Application No. PCT/EP2019/071138 mailed Feb. 13, 2020, 11 pages.

\* cited by examiner

BATTERY HOUSING, BATTERY SYSTEM AND ASSEMBLY METHOD FOR A BATTERY SYSTEM

CROSS REFERENCE TO RELATED APPLICATIONS

This application is a national stage of International Application No. PCT/EP2019/071138 filed Aug. 6, 2019, which claims priority from German Patent Application 10 2018 119 051.4 filed Aug. 6, 2018 in the German Patent and Trademark Office, the disclosures of which are incorporated herein by reference in their entirety.

BACKGROUND

Technical Area

The present invention relates to a battery housing for constructing a battery system for an electric vehicle. In this case, the battery housing is used to receive a multiplicity of battery cells that can be received for example in battery modules. Moreover, the present invention relates to a battery system for an electric vehicle having a battery housing of this type and an assembly method for a battery system.

Related Art

An electric vehicle is understood in this case to be an electrically driven vehicle, in particular a vehicle that is driven purely in an electric manner or a hybrid vehicle. Vehicles of this type are equipped with an electrical energy storage device in the form of a battery, for example a traction battery or drive battery, which stores and makes available the electrical energy that is necessary for the driving operation. The batteries are also referred to as rechargeable batteries. In this case, they are generally electrochemical rechargeable batteries, in particular lithium ion rechargeable batteries.

Batteries of this type are usually not constructed as a mono-block but rather are constructed in a modular manner from a multiplicity of battery cells that are connected in an electrical manner to one another. It is accordingly known for the construction of a battery system in an electric vehicle to arrange battery cells in battery modules and then to combine multiple battery modules to form a battery. This increases the configurability of battery systems and renders it possible to use comparatively cost-effective standard battery cells.

In terms of the present disclosure, an electrochemical storage cell, for example a secondary cell, is understood as a battery cell. The term "cell" can be understood with respect to the physical appearance of the component as the smallest contactable component. In contrast, a battery module is understood to be a component that combines a multiplicity of battery cells. Accordingly, a component that is constructed from one or more interconnected battery modules is understood as a battery or battery system. The battery or the battery system are generally provided for use in an electric vehicle but they can also be used in other vehicles or in other areas of application.

Moreover, battery systems of this type include a battery housing that is used to receive, hold and connect the battery cells or the battery modules in the proper manner. High demands with regard to sealing are placed on the battery housing that is used for the application in the field of electric vehicles. In this case, the battery housing must also ensure that the inner chamber that receives the battery cells is sealed even under high pressure.

A battery housing is known in which multiple battery modules are arranged in receiving chambers or compartments, which are spatially separated from one another, in a distributed manner adjacent to one another and/or one above the other on multiple levels, so-called stories. In order to provide the electrical connection of the battery cells that are arranged in the different receiving chambers, usual connecting elements are provided on an outer face of the battery housing and said connecting elements engage via through-going holes in the outer wall of the battery housing into the different receiving chambers. The through-going holes that are necessary for this purpose in the outer wall of the battery housing are to be sealed separately in order to be able to meet the sealing requirements of the battery housing. However, the provision of additional seals affects the production costs and in particular assembly costs. This provision of additional seals can also affect the operating safety of the battery system since, to be precise, as the number of seals increases so does the risk of the battery system experiencing leakages.

Due to the high voltages that prevail in a battery system of this type, an installer can be exposed to a safety risk while assembling or dismantling battery systems of this type. This relates in particular to battery systems having a battery housing in which battery cells are to be arranged in a limited amount of space in receiving chambers, which are separated from one another, and said battery cells are to be interconnected and accordingly dismantled. Accordingly, there is a need to provide a battery housing that includes a compact construction and that can simultaneously contribute to a simpler and safer assembly method and dismantling method for an installer.

SUMMARY

An improved battery housing and an improved battery system having a battery housing of this type is described herein according to various embodiments. Moreover, an improved assembly method for a battery system is to be provided.

Accordingly, a battery housing for an electric vehicle is proposed. The battery housing includes two receiving chambers, which are separated from one another by means of a partition wall, for receiving battery cells and a conductor sheath that penetrates the partition wall and can receive an electrical connecting element so as to connect in an electrically conductive manner the battery cells that are to be arranged in a different receiving chamber of the two receiving chambers.

By virtue of the fact that the battery housing includes the conductor sheath, it is rendered possible to realize the solution proposed here that connecting elements are provided so as to make the electrical connection and consequently to interconnect battery cells that are to be arranged in different receiving chambers within the battery housing. In comparison to battery housings known from the prior art in which connecting elements are arranged externally on the battery housing or are embodied by separate cables that are guided externally, it is thus possible to ensure a compact construction of a battery system. Accordingly, the proposed structural configuration of the battery housing reduces or avoids the provision of externally lying electrical connections between receiving chambers. As a result of it being possible to forego such externally lying electrical connections in the case of the proposed battery housing, it is possible to reduce the risk of leakages during the operation of the battery housing, to reduce the risk of cables becoming detached and to configure the battery in a more compact manner. In particular, it is possible to prevent that electrical connections that are arranged externally on the battery housing are exposed and thus easily accessible to persons. Accordingly, the proposed battery housing offers better protection against misuse or vandalism, environmental influences and vibrations that occur during operation. Furthermore, additional components for protecting externally lying electrical connections can be omitted. Production costs and in particular assembly costs can also be reduced by means of the proposed solution.

In the proposed solution, the conductor sheath can be used as a guiding element for the connecting element that is to interconnect the different battery cells. Accordingly, the conductor sheath can define a conductor duct into which the connecting element can be inserted at least from one side and in a state inserted therein displaced in the direction of a receiving position, in particular guided in a displaceable manner. In this manner, the proposed battery housing can simplify the assembly of a battery system having a multiplicity of interconnected battery cells.

Furthermore, the conductor sheath provides protection for the connecting element that can be received therein. In particular, the conductor sheath can be provided in such a manner that in a state in which the connecting element is received therein the conductor sheath encompasses said connecting element at least in sections. In particular when the battery housing is used in an electric vehicle, it is possible even in the event of a greatly deformed state of the battery housing, as can occur for example after an electric vehicle is involved in an accident, for the conductor sheath to prevent the connecting element being exposed and thus to prevent an undesired electrical contact between the connecting element and the other components of the battery system. In other words, the proposed battery housing contributes to an increased operational safety of a battery system that includes the battery housing.

The proposed battery housing can be provided for use in an electric vehicle but it is not limited to this application. On the contrary, the battery housing can be used in any arbitrarily suitable application for receiving, holding and/or interconnecting battery cells.

As described above, the battery housing includes two receiving chambers that are separated from one another for receiving battery cells. The receiving chambers can form in particular receiving compartments for the battery cells.

Primarily, receiving chambers that are separated from one another are understood to be in particular receiving chambers that are spatially and/or structurally delimited. In the proposed configuration, the two receiving chambers can be separated from one another in a spatial and/or structural manner by the partition wall. Accordingly, the partition wall can delimit both a first receiving chamber of the two receiving chambers and a second receiving chamber of the two receiving chambers, in particular in a spatial and/or structural manner. Furthermore, the two receiving chambers can each be delimited by an external wall of the battery housing, wherein the partition wall can be arranged within the battery housing.

In one development, the battery housing can include more than two in particular a multiplicity of receiving chambers that are arranged adjacent to one another.

The receiving chambers can be provided so as for each to receive a multiplicity of battery cells. In other words, it is possible, when the battery housing is in a state in which the battery cells have been received, to arrange a multiplicity of battery cells in the first receiving chamber and/or in the second receiving chamber.

The battery cells can be combined to form units and interconnected therein. For example, the battery cells can be interconnected in parallel or in series in units of this type, wherein the units include two terminals in order to connect said units themselves to other units and thus to form a battery. For example, the battery cells can be combined to form so-called battery cell packs that include a multiplicity of battery cells. Alternatively or in addition, it is possible to combine the battery cells to form so-called battery modules that include a multiplicity of battery cells or a multiplicity of battery cell packs. The receiving chambers can in this case each be configured so as to receive one or multiple units of this type that include a multiplicity of battery cells.

The receiving chambers can accordingly have a shape that is adapted to suit the battery cells that are to be received therein. The receiving chambers can also have a shape that is adapted to suit the battery cell packs or battery modules that are to be received therein. For example, the receiving chambers can each form a chamber that is essentially cube-shaped. The receiving chambers can essentially be of an identical size.

The battery housing can be embodied in such a manner that the receiving chambers can be arranged adjacent to one another and in particular parallel to one another. For example, the battery housing can be of a stacked construction in which the receiving chambers are arranged one above the other, in particular arranged in a stack. More precisely, when the battery housing is in the state in which it is assembled in the electric vehicle, the receiving chambers can be arranged in a vertical direction of the electric vehicle one above the other, in particular in a stack. Accordingly, the receiving chambers can form in the battery housing stories or compartments for the battery cells. Alternatively or in addition, when the battery housing is in the assembled state, the receiving chambers can be arranged in at least one direction in a transverse manner with respect to the vertical direction.

The conductor sheath can form an insulation component for the connecting element and consequently fulfill a permanent insulating function within the battery housing. For this purpose, the conductor sheath can be produced from an electrically insulating material. The electrically insulating material can be for example a flexible material, in particular a rubber-like material, which under normal conditions can deform relatively easily. Alternatively, the electrically insulating material can be an essentially rigid material, for example a synthetic material, which under normal conditions can only deform when subjected to a relatively strong force. By virtue of the fact that the conductor sheath can be embodied as an insulation component, the connecting element that is to be received therein can be provided in the form of an exposed conductor, in other words in the form of a conductor that is not covered by an insulation material. In this case, the connecting element can however also be provided in the form of a conductor that is encased by an insulation.

Alternatively, the conductor sheath can be produced from a non-electrically insulating material, for example from a metal, and configured so as to receive therein as a connecting element a conductor that is encased by an insulation. In this case, the insulating function is fulfilled by the conductor casing itself.

The conductor sheath can protrude into at least one of the two receiving chambers and consequently be arranged therein. More precisely, the conductor sheath can include a first section that protrudes into the first receiving chamber and/or a second section that protrudes into the second receiving chamber. In this case, the first and the second section of the conductor sheath can have a different length. In other words, the first and the second section of the conductor sheath can have a different length along an extension direction of the conductor sheath. For example, the second section that protrudes into the second receiving chamber can be longer than the first section of the conductor sheath that protrudes into the first receiving chamber, or conversely.

In particular, the conductor sheath can have along its extension direction a height or a length, in particular a total height or length, which is greater than a height of the first or of the second receiving chamber which extends along the extension direction of the conductor sheath. For example, the conductor sheath can have a height or a length along its extension direction that is respectively greater than the height of the first and of the second receiving chamber which extends along the extension direction.

Alternatively or in addition, the conductor sheath can be provided in such a manner that in a state in which the battery cells are received into at least one receiving chamber, the conductor sheath has along its extension direction a height or length which is greater than a height, which extends along the extension direction, of the battery cells that are received in the first and/or the second receiving chamber. Moreover, the conductor sheath can have along its extension direction a height or length which is greater than a height, which extends along the extension direction, of the at least one battery module, which is received in the first and/or the second receiving chamber, and/or of the battery cell pack.

In one development, the conductor sheath can be provided in such a manner that in a state of the battery housing in which respectively battery cells are received into the two receiving chambers, a first end of the conductor sheath, in particular of the first section of the conductor sheath, is arranged along the extension direction essentially at a height of a terminal of a battery cell that is arranged in the first receiving chamber or of a battery module that is arranged in the first receiving chamber. Alternatively or in addition, a second end of the conductor sheath which lies opposite to the first end, said second end being in particular of the second section of the conductor sheath, can be arranged along the extension direction essentially at the height of a further terminal of a battery cell that is arranged in the second receiving chamber or of a battery module that is arranged in the second receiving chamber.

Moreover, the conductor sheath can embody an edge protector for at least one end section of the connecting element that is received therein. It is possible in this manner to prevent the end section of the connecting elements becoming exposed and thus in an unintentional manner coming into contact, in particular coming into electrically conductive contact, with another component of the battery system, in particular of the battery housing, For this purpose, the conductor sheath can be embodied in such a manner that in the state in which the conductor sheath receives the connecting element at least one end of the conductor sheath protrudes along its extension direction and/or along at least one direction in a transverse manner with respect to the extension direction beyond the connecting element. In this manner, the conductor sheath can encompass an end section of the connecting element at least in part, wherein the end section of the connecting element is accessible or can be contacted in an electrical manner via a cut-out that is embodied on the end of the conductor sheath.

Moreover, the battery housing can include at least one further conductor sheath that penetrates the partition wall and can receive a further electrical connecting element so as to connect in an electrically conductive manner the battery cells that are arranged in the different receiving chambers. The conductor sheath and the at least one further conductor sheath can be configured so as to form a current circuit that penetrates the two receiving chambers. More precisely, the conductor sheath and the at least one further conductor sheath can form in this case respectively a conductor section of the current circuit. For example, the conductor sheath and the at least one further conductor sheath can be configured so as to interconnect in particular in series or parallel to one another the battery cells that are to be arranged in the first receiving chamber and the battery cells that are to be arranged in the second receiving chamber.

In one development, the battery housing can include the connecting element. The connecting element can be received in the conductor sheath, in particular in the receiving position. The connecting element fulfills the function of a conductor for connecting in a conducting manner the battery cells that are to be arranged in the different receiving chambers. For example, the connecting element can form a high voltage conductor section or a low voltage conductor section of a battery circuit.

The connecting element can be arranged in the receiving position fully or in sections in the conductor sheath. More precisely, in the receiving position a first section of the connecting element is encased in the conductor sheath. In addition, a second section of the connecting element protrudes out of the conductor duct. The second section can be exposed, in other words not be covered by an insulating material or not include an insulating casing.

The first section and the second section of the connecting element can be bent at an angle with respect to one another which is essentially greater than 0° to 180°. For example, the first section and the second section of the connecting element can be arranged relative to one another at an angle of essentially 45° or 90° or 135°.

The first and/or the second section of the connecting element can be arranged in the region of a connecting rail that is arranged in the battery housing. Within a receiving chamber, the connecting rail can be connected in an electrically conductive manner to multiple battery cells. For example, the first and/or the second section of the connecting element can be in direct contact with the connecting rail. Alternatively or in addition, in a state in which battery cells are arranged at least in one receiving chamber, the first and/or the second section, in particular a respective end thereof, can be arranged in the region of or in direct contact with a terminal of a battery cell, in particular of a battery module or battery cell pack.

In one development, the battery housing can be constructed from at least two mutually complementary and mutually engaging assemblies. In this case, each assembly can include at least one of the receiving chambers. More precisely, one inner chamber of the respective assembly can in each case embody the receiving chamber at least in sections, wherein a base of a further assembly that engages in the assembly can delimit the receiving chamber on at least one side and in particular can form a partition wall. In other words, a receiving chamber can be embodied in each case between two mutually engaging assemblies.

The conductor sheath can be attached or fixedly connected to a first of the two assemblies. Alternatively or in addition, a second of the two assemblies can include the partition wall that is provided with a through-going hole that is complementary to the conductor sheath with the result that in a state in which the first and the second assemblies engage with one another the conductor sheath is inserted via the through-going hole into the receiving chamber that is encased by the second assembly. In other words, the conductor sheath can be used as a male connector and the associated complementary through-going hole as a female connector which are to be brought into engagement during the assembly procedure. Furthermore, the first and/or the second assembly can each include a partition wall, which is provided with a through-going hole, and a conductor sheath.

In one development, a closure cap can be provided that can be releasably attached to an end section of the conductor sheath. The end section can be arranged in particular lying opposite an end section of the conductor sheath which is attached to the assembly. The closure cap can be used in particular for covering the connecting element that is exposed at the end section. In this manner, the closure cap acts as an insulation that increases in particular the safety for an installer during the procedure of assembling a battery system that includes the battery housing.

Furthermore, the closure cap can include a shape that tapers in the direction of one end. Furthermore, the closure cap can thus fulfill the function of a centering or guiding element during the procedure of assembling the battery housing and accordingly simplify the assembly procedure for an installer.

In particular, the at least two assemblies can be stacked one above the other. For example, the battery housing can include a first assembly on which a second assembly can be arranged with the result that the two assemblies are arranged in a stack. The first assembly includes a first base that together with side walls of the first assembly delimit a first receiving chamber that is encompassed in the assembly. Furthermore, the first receiving chamber is delimited by a second base of the second assembly that is arranged on the first assembly.

The second base of the second assembly delimits in turn together with side walls of the second assembly a second receiving chamber that is encased in the second assembly. The second base of the second assembly forms in this case a partition wall that separates the first and the second received chamber from one another. In turn, a further assembly or a cover that is complementary to the second assembly can be arranged on the second assembly as a result of which the second receiving chamber can be delimited from above.

In this manner, the battery housing can include a modular construction. In other words, the battery housing can thus provide a cost-effective structure whilst simultaneously providing a high degree of configurability.

A battery system for an electric vehicle is also provided that includes a battery housing that includes the aforementioned features and receives a multiplicity of battery cells. The features described above in connection with the battery housing consequently also apply accordingly for the battery system as disclosed.

An assembly method for a battery system, in particular for an electric vehicle, is further proposed. The battery system can include in particular the features of the battery system described above. The features described above in connection with the battery housing and the battery system consequently also apply accordingly for the assembly method.

The assembly method includes the following steps:

providing a first assembly of a battery housing that includes a first receiving chamber for receiving at least one battery cell;

arranging at least one battery cell in the first receiving chamber;

providing a conductor sheath that receives an electrical connecting element for connecting in an electrically conductive manner the battery cells that are to be arranged in a different receiving chamber of the two receiving chambers, wherein a closure cap is releasably attached to an end section of the conductor sheath on which a first end of the connecting element is exposed, said closure cap covering in particular the exposed end of the connecting element;

attaching a second end of the connecting element which lies opposite the first end to a terminal of the battery cell that is arranged in the first receiving chamber;

providing a second assembly of the battery housing that includes a second receiving chamber for receiving at least one further battery cell and includes a partition wall that delimits the second receiving chamber and is provided with a through-going hole that is complementary to the conductor sheath;

joining together the first and the second assembly in such a manner that the conductor sheath is inserted into the second receiving chamber via the through-going hole that is provided in the partition wall;

arranging at least one further battery cell in the second receiving chamber;

releasing the closure cap from the conductor sheath; and connecting the first end of the connecting element in an electrically conducting manner to a terminal of the further battery cell.

The above described method steps can accordingly be performed in the sequence listed or in a sequence which deviates therefrom. Furthermore, a dismantling method is disclosed that includes the above described steps that are to be performed in the reverse sequence.

BRIEF DESCRIPTION OF THE FIGURES

Further embodiments of the invention are explained in detail by the description below of the figures.

DETAILED DESCRIPTION

Exemplary embodiments are described below with reference to the figures. In so doing, like, similar or like-functioning elements are provided in the different figures with identical references, and in part a repeated description of these elements is not provided in order to avoid redundancies.

Figure 1:
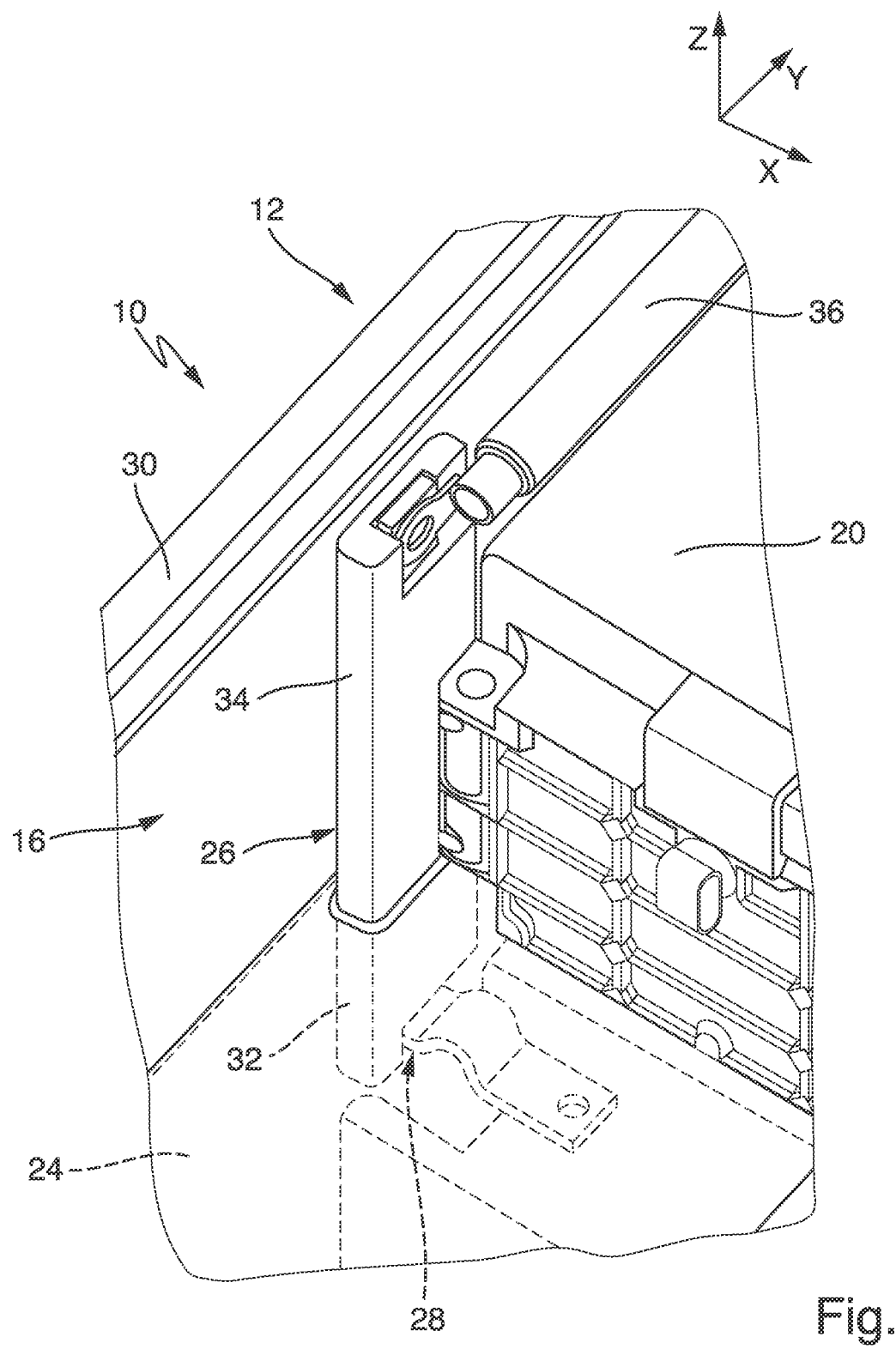
FIG. 1 illustrates a perspective view of an inner chamber of a battery system having a battery housing of a first embodiment.
Figure 2:
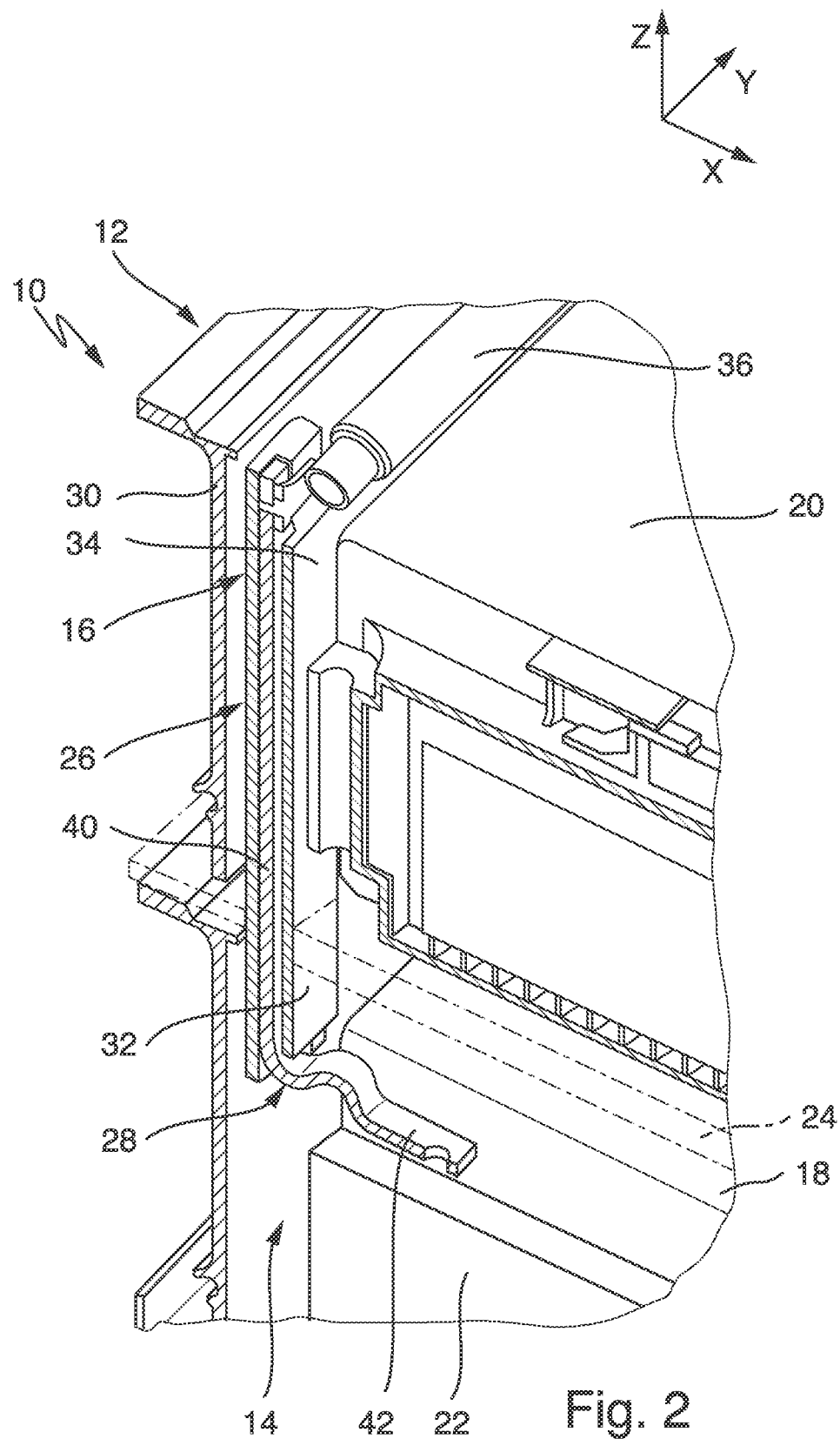
FIG. 2 illustrates a longitudinal sectional view of the battery system shown in FIG. 1.

FIGS. 1 and 2 illustrate schematically a battery system 10 having a battery housing 12 of a first embodiment. The battery system 10 is provided for use in an electric vehicle.

As illustrated in FIG. 2, the battery housing 12 includes a first receiving chamber 14 and a second receiving chamber 16 that are configured so as to receive multiple battery modules 18, 20 that include in each case a multiplicity of battery cells 22. The first and the second receiving chamber 14, 16 are separated from one another by means of a partition wall 24. In FIGS. 1 and 2, the partition wall 24 is represented as transparent and includes multiple cooling ducts through which a cooling agent can flow so as to cool the battery system.

FIGS. 1 and 2 illustrate a first battery module 18 that is arranged in the first receiving chamber 14 and a second battery module 20 that is arranged in the second receiving chamber 16. It is also possible to arrange in the first and the second receiving chamber 14, 16 respectively more than only one battery module 16, 18.

Moreover, the battery housing 12 includes a conductor sheath 26 that penetrates the partition wall 24 and receives an electrical connecting element 28 so as to connect in an electrically conductive manner the battery modules 18, 20 that are arranged in a different receiving chamber of the two receiving chambers 14, 16.

The first and the second receiving chamber 14, 16 respectively form receiving compartments for the battery modules 18, 20 that are delimited at the side by external walls 30 of the battery housing 12. The partition wall 24 is arranged in this case within the battery housing 12. The receiving chambers 14, 16 include a shape that is complementary to that of the battery modules 18, 20 that are received therein.

The battery housing 12 is provided in a stacked construction in which the receiving chambers 14, 16 are arranged one above the other, in other words are arranged in a stack. More precisely, when the battery housing 12 is in the assembled state in the electric vehicle, the two receiving chambers 14, 16 are arranged one above the other in a vertical direction Z of the electric vehicle.

The conductor sheath 26 is configured as an insulation component. Accordingly, the conductor sheath 26 is produced from an electrically insulating material. In the embodiment illustrated here, the conductor sheath 26 protrudes into the first and the second receiving chamber 14, 16. More precisely, the conductor sheath 26 includes a first section 32 that protrudes into the first receiving chamber 14 and a second section 34 that protrudes into the second receiving chamber 16. The conductor sheath 26 is configured as an elongated, tubular component that defines a conductor duct for the connecting element 28. The conductor sheath 26 extends in a direction that coincides with a longitudinal direction of the conductor duct defined therein and is parallel to the vertical direction Z of the electric vehicle. The height of the first section 32 of the conductor sheath 26 along the extension direction Z is smaller than a height of the second section 34 of the conductor sheath 26 along the extension direction Z. Moreover, the conductor sheath 26 has a total height along the extension direction Z that is respectively greater than a height of the first and the second receiving chamber 14, 16 along the extension direction Z. Furthermore the conductor sheath 26 has a total height along the extension direction Z that is respectively greater than a height of the first and of the second battery module 18, 20 along the extension direction Z.

The conductor sheath 26 is positioned in the battery housing 12 in such a manner that a first end of the conductor sheath 26, in particular of the first section 32, is arranged along the extension direction Z essentially at a height of a terminal of the first battery module 18. Moreover, a second end, which lies opposite the first end, of the conductor sheath 26, in particular of the second section 34, is arranged along the extension direction Z essentially at a height of a further terminal of the second battery module 20 and in the region of a connecting rail 36. The connecting rail 36 is arranged within the second receiving chamber 16 and connects the connecting element 28 to a terminal of the second battery module 20. A corresponding connecting rail can also be arranged in the first receiving chamber 14.

In the exemplary embodiment illustrated in FIGS. 1 and 2, the conductor sheath 26 forms on the end of the second section 34 an edge protector for the connecting element 28 that is received in said conductor sheath. For this purpose, the conductor sheath 26 is embodied in such a manner that the conductor sheath 26 protrudes along its extension direction, in other words the vertical direction Z, in the direction of the end of the second section 34, beyond the connecting element 28. Moreover, the conductor sheath 28 protrudes at the same end along a first direction in a transverse manner with respect to the extension direction Z, in particular of a longitudinal direction X of the electrical vehicle, and along a second direction in a transverse manner with respect to the extension direction Z and in a transverse manner with respect to the first direction, in particular a width direction Y, beyond the connecting element 28. In this manner, the conductor sheath 26 encompasses an end section of the connecting element 28 in part, wherein the end section of the connecting element 28 is exposed so as to make electrical contact via a cut-out 38 that is embodied on the end of the conductor sheath 26.

The battery housing 12 includes moreover at least one further conductor sheath that penetrates the partition wall 24 and is embodied according to the above described conductor sheath 26. It is possible in this manner to embody a current circuit that penetrates two receiving chambers 14, 16.

As illustrated in FIG. 2, the connecting element 28 includes a first section 40 that is encased in the conductor sheath 26 and a second section 42 that protrudes out of the conductor sheath 26 and said sections are bent relative to one another by essentially 90°. The first section 40 of the connecting element 28 is in direct contact with the connecting rail 26, wherein the second section 42 is in direct contact with the terminal of the first battery module 18.

In the embodiment illustrated here, the battery housing 12 is constructed from a first and a mutually complementary and mutually engaging second assembly. Each assembly includes in this case a base that is embodied in the form of the partition wall 24 and includes side walls that adjoin thereon. In a dismantled state, the assemblies include respectively a receiving chamber 14, 16 that in this state is open in the upwards direction. In the exemplary embodiment illustrated here, the first assembly includes the first receiving chamber 14 that in the illustrated assembled state of the battery housing 12 is delimited in the upwards direction by the base, in other words by the partition wall 24, of the second assembly that is stacked thereon. Accordingly, the second assembly includes the second receiving chamber 16 on which it is possible to stack further assemblies.

In the illustrated configuration, the conductor sheath 26 is connected to the first assembly via the connecting element 28 and the first battery module 18. The partition wall 24 that is embodied by the second assembly includes a through-going hole that is complementary to the conductor sheath 26 with the result that in the illustrated mutually engaging state of the first and the second assembly the conductor sheath 26 is inserted via the through-going hole into the second receiving chamber 16 that is encased by the second assembly.

Figure 3:
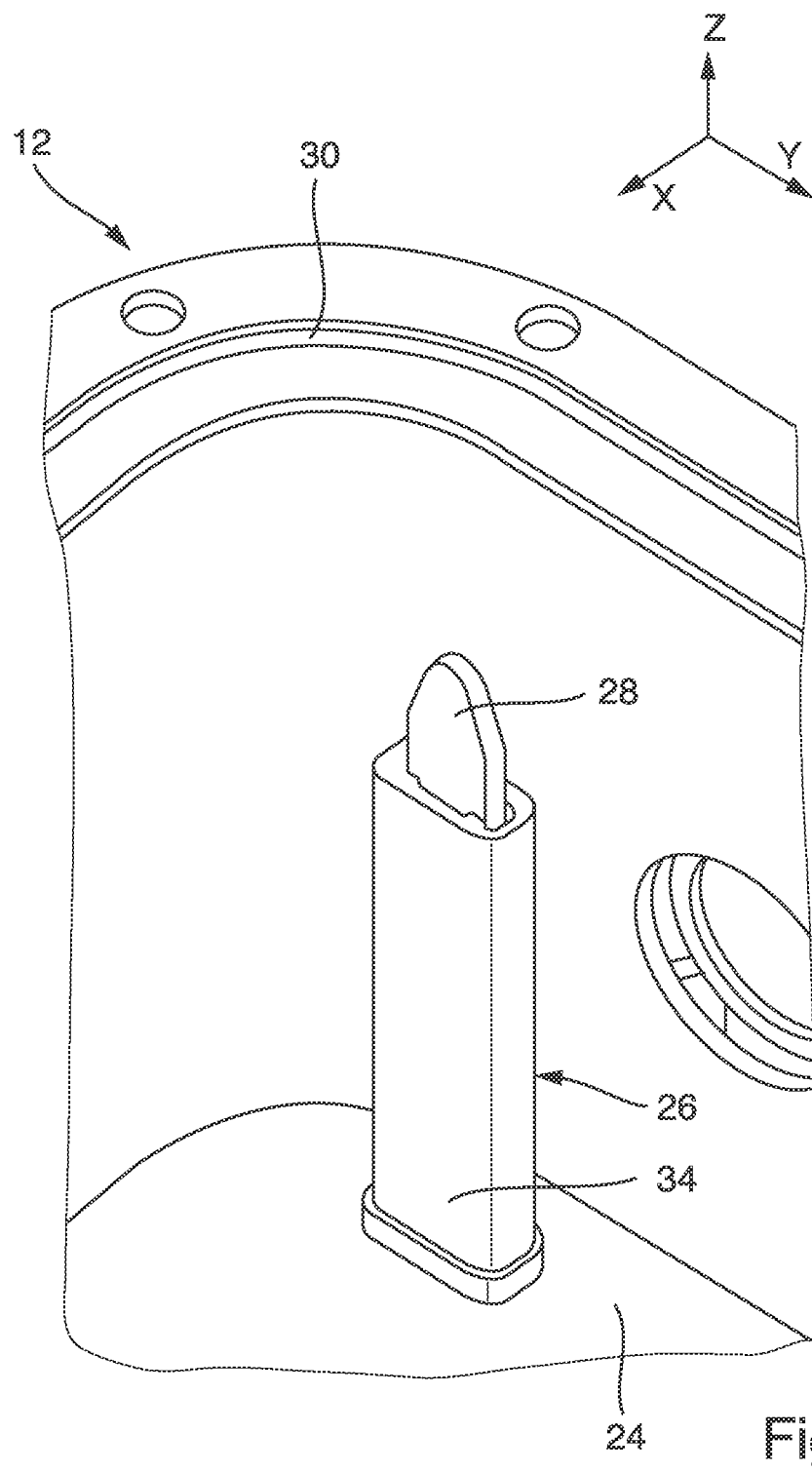
FIG. 3 illustrates a perspective view of an inner chamber of a battery housing of a second embodiment in a first state.
Figure 4:
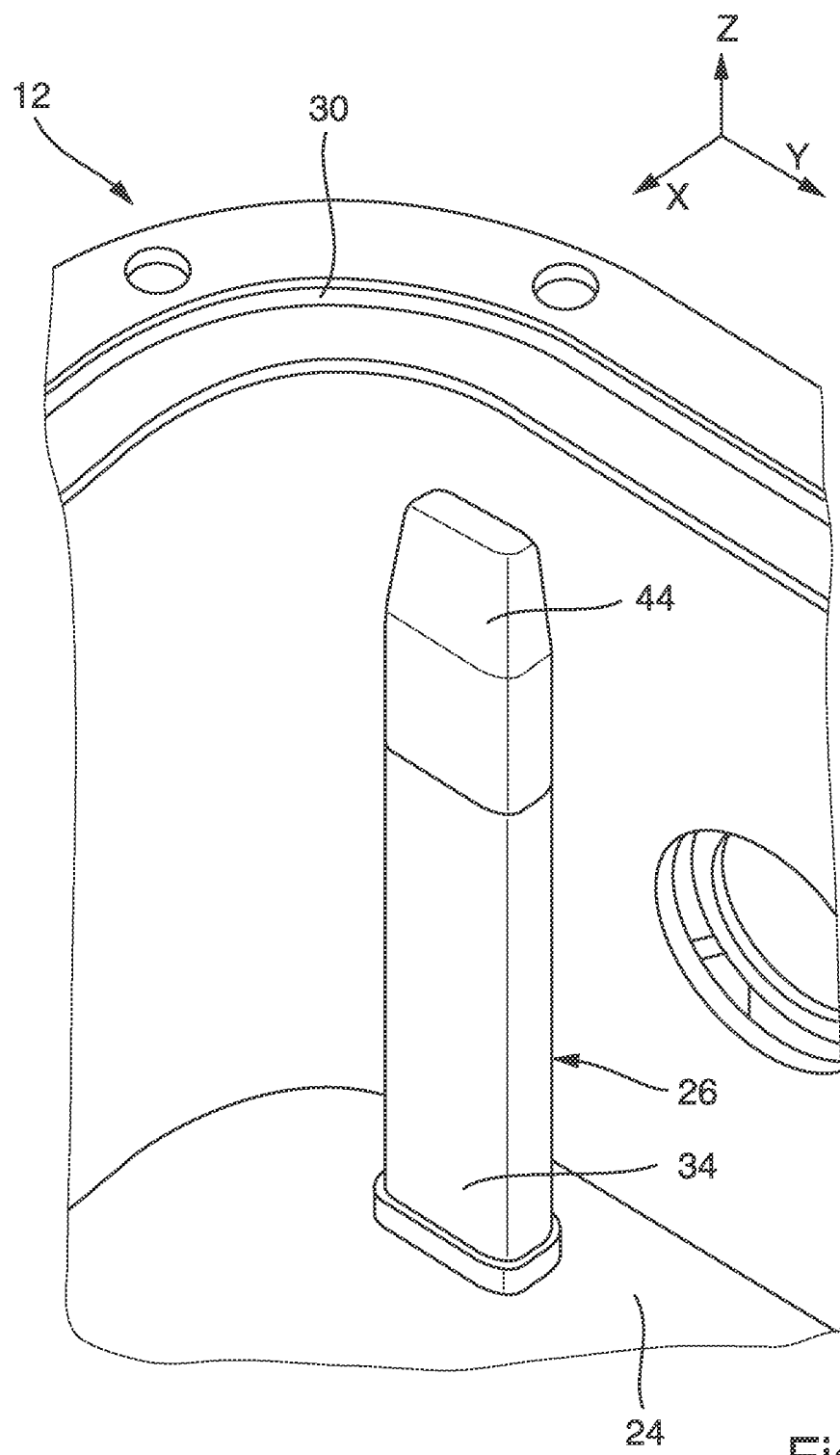
FIG. 4 illustrates the battery housing shown in FIG. 3 in a second state.

FIGS. 3 and 4 illustrate a further embodiment of the battery housing 12. In contrast to the configuration illustrated in FIGS. 1 and 2, the second embodiment differs by means of the structure of the conductor sheath 26 and the connecting element 28 that is received therein. In this case, the connecting element 28 protrudes along the extension direction beyond the conductor sheath 26. As illustrated in FIG. 4, the battery housing 12 includes a closure cap 44 that is releasably attached to an end section of the conductor sheath 26. More precisely, the closure cap 44 can include a shape that tapers in the direction of its end. In the state illustrated in FIG. 3, the closure cap 24 is released from the conductor sheath 26.

Where applicable, all individual features that are illustrated in the exemplary embodiments can be combined with one another and/or exchanged without abandoning the scope of the invention.

The invention claimed is:

1. A battery housing for an electric vehicle comprising:
a first receiving chamber configured to receive a first plurality of battery cells;
a second receiving chamber configured to receive a second plurality of battery cells, wherein the first receiving chamber and the second receiving chamber are separated from one another by a partition wall; and
a conductor sheath that penetrates the partition wall and is configured as an elongated, tubular component that defines a conductor duct that is configured to receive an electrical connecting element,
wherein:
the battery housing is constructed from at least two mutually complementary and mutually engaging assemblies that each include the first receiving chamber or the second receiving chamber,
the conductor sheath is configured to be attached or fixedly connected to a first assembly of the at least two assemblies,
a second assembly of the at least two assemblies comprises the partition wall, the partition wall comprising a through-going hole that is complementary to the conductor sheath such that when the first assembly and the second assembly are in a mutually engaging state, the conductor sheath is inserted via the through-going hole into the receiving chamber that is encased by the second assembly,
the first assembly and the second assembly are stacked one above the other in a vertical direction,
the electrical connecting element is configured to connect the first plurality of battery cells that are arranged in the first receiving chamber and the second plurality of battery cells that are arranged in the second receiving chamber in an electrically conductive manner,
the conductor sheath comprises a first section that protrudes into the first receiving chamber and a second section that protrudes into the second receiving chamber by extending in the vertical direction through the through-going hole, the conductor sheath is arranged entirely within the first receiving chamber and the second receiving chamber, and the conductor sheath is spaced apart from the first plurality of battery cells and the second plurality of battery cells, and
in a state in which the conductor sheath receives the electrical connecting element, at least one end of the conductor sheath protrudes along an extension direction of the conductor sheath and along at least one direction in a transverse manner with respect to the extension direction beyond the electrical connecting element.

2. The battery housing of claim 1, wherein the first receiving chamber and the second receiving chamber are delimited by an external wall of the battery housing, and the partition wall is arranged within the battery housing.

3. The battery housing of claim 1, wherein the first receiving chamber and the second receiving chamber are each configured to receive the first plurality and the second plurality of battery cells, respectively, that are combined to form at least one battery cell pack or at least one battery module.

4. The battery housing of claim 1, wherein the conductor sheath comprises an electrically insulating material.

5. The battery housing of claim 1, wherein the first section and the second section have a different length along the extension direction of the conductor sheath.

6. The battery housing of claim 1, wherein the conductor sheath has a height along its extension direction that is greater than a height along an extension direction of the first receiving chamber or the second receiving chamber.

7. The battery housing of claim 1, wherein the first or the second plurality of battery cells are combined to form a battery cell pack or a battery module, and in a state in which the battery cell pack or the battery module is received into the first receiving chamber or the second receiving chamber, the conductor sheath has a height along its extension direction that is greater than a height, which extends along the extension direction, of the battery module or the battery cell pack that is received in the first receiving chamber or the second receiving chamber.

8. The battery housing of claim 1, wherein in a state where the first and second plurality of battery cells are received into the first receiving chamber and the second receiving chamber, respectively, a first end of the conductor sheath is arranged along its extension direction at a height of a first terminal of a battery cell of the first plurality of battery cells that is arranged in the first receiving chamber and a second end of the conductor sheath is arranged along its extension direction at a height of a second terminal of a battery cell of the second plurality of battery cells that is arranged in the second receiving chamber.

9. The battery housing of claim 1, further comprising an additional conductor sheath that penetrates the partition wall and is configured to receive an additional electrical connecting element, wherein the additional electrical connecting element is configured to connect the first plurality of battery cells that are arranged in the first receiving chamber and the second plurality of battery cells that are arranged in the second receiving chamber in an electrically conductive manner so as to form a current circuit that penetrates the first receiving chamber and the second receiving chamber.

10. The battery housing of claim 1, wherein the electrical connecting element comprises a first section that is encased in the conductor sheath and a second section that protrudes beyond the conductor sheath.

11. The battery housing of claim 10, wherein the first section of the electrical connecting element is in direct contact with a connecting rail that is arranged in the battery housing.

12. The battery housing of claim 10, wherein in a state in which the first plurality of battery cells are arranged in the first receiving chamber or the second plurality of battery cells are arranged in the second receiving chamber, the second section of the electrical connecting element is in direct contact with a terminal of the first or the second plurality of battery cells or of a battery module.

13. The battery housing of claim 1, further comprising a closure cap, wherein the closure cap is configured to be releasably attached to one end of the conductor sheath.

14. The battery housing of claim 13, wherein the closure cap comprises a shape that tapers in a direction of one end.

15. A battery system for an electric vehicle comprising:
the battery housing of claim 1;
the first plurality of battery cells that are arranged in the first receiving chamber; and
the second plurality of battery cells that are arranged in the second receiving chamber.

16. A method of assembling a battery system, comprising:
providing a first assembly of a battery housing that comprises a first receiving chamber, wherein the first receiving chamber is configured to receive a first battery cell;
arranging the first battery cell in the first receiving chamber;
providing a conductor sheath that receives an electrical connecting element and is configured such that, in a state in which the conductor sheath receives the electrical connecting element, at least one end of the conductor sheath protrudes along an extension direction of the conductor sheath and along at least one direction in a transverse manner with respect to the extension direction beyond the electrical connecting element, wherein a closure cap is releasably attached to an end section of the conductor sheath on which a first end of the electrical connecting element is exposed, and wherein the conductor sheath is configured as an elongated, tubular component that defines a conductor duct that is configured to receive the electrical connecting element;
providing a second assembly of the battery housing that comprises a second receiving chamber and a partition wall, wherein the second receiving chamber is configured to receive a second battery cell, and the partition wall delimits the second receiving chamber and comprises a through-going hole that is complementary to the conductor sheath such that when the first assembly and the second assembly are in a mutually engaging state, the conductor sheath is inserted via the through-going hole into the second receiving chamber;
arranging a second battery cell in the second receiving chamber, wherein the electrical connecting element is configured to connect the first battery cell and the second battery cell that are arranged in the first receiving chamber and the second receiving chamber in an electrically conductive manner;
attaching a second end of the electrical connecting element, which lies opposite the first end, to a terminal of the first battery cell;
joining the first assembly and the second assembly together so that the first assembly and second assembly are stacked one above the other in a vertical direction and in such a manner that the conductor sheath is inserted into the second receiving chamber via the through-going hole in the partition wall and a first section of the conductor sheath protrudes into the first receiving chamber and a second section of the conductor sheath protrudes into the second receiving chamber by extending in the vertical direction through the through-going hole, the conductor sheath is arranged entirely within the first receiving chamber and the second receiving chamber, the conductor sheath is spaced apart from the first battery cell and the second battery cell, and the conductor sheath is configured to be attached or fixedly connected to the first assembly or the second assembly;
releasing the closure cap from the conductor sheath; and
connecting the first end of the electrical connecting element in an electrically conducting manner to a terminal of the second battery cell.

17. The method of claim 16, wherein the conductor sheath comprises an electrically insulating material.

* * * * *